(12) United States Patent
Demtröder et al.

(10) Patent No.: US 9,771,924 B2
(45) Date of Patent: Sep. 26, 2017

(54) WIND TURBINE POWER TRANSMISSION SYSTEM

(75) Inventors: Jens Demtröder, Rønde (DK); Christoph Bugiel, Strasbourg (FR); Andreas Lakämper, Kirchheimbolanden (DE); Michael Lundgaard Bitsch, Langå (DK); Ralf Rüschoff, Datteln (DE); Antonino Pizzuto, Morfelden-Waldorf (DE); Søren Skovlund, Værløse (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1197 days.

(21) Appl. No.: 13/880,167

(22) PCT Filed: Oct. 17, 2011

(86) PCT No.: PCT/DK2011/050388
§ 371 (c)(1),
(2), (4) Date: Aug. 2, 2013

(87) PCT Pub. No.: WO2012/052022
PCT Pub. Date: Apr. 26, 2012

(65) Prior Publication Data
US 2013/0302144 A1    Nov. 14, 2013

Related U.S. Application Data

(60) Provisional application No. 61/393,995, filed on Oct. 18, 2010, provisional application No. 61/450,151, filed on Mar. 8, 2011.

(51) Int. Cl.
*F03D 11/02*    (2006.01)
*F03D 9/00*    (2016.01)
(Continued)

(52) U.S. Cl.
CPC ............... *F03D 9/002* (2013.01); *F03D 9/25* (2016.05); *F03D 13/10* (2016.05); *F03D 15/00* (2016.05);
(Continued)

(58) Field of Classification Search
CPC .......... F03D 9/002; F03D 9/003; F03D 1/001; H02K 7/1838
(Continued)

(56) References Cited

U.S. PATENT DOCUMENTS

2010/0133854 A1* 6/2010 Jansen ................... F03D 11/02
290/1 C
2011/0285137 A1* 11/2011 Casazza .................. F03D 9/002
290/55

FOREIGN PATENT DOCUMENTS

| EP | 1855001 A1 | 11/2007 |
| EP | 1867871 A2 | 12/2007 |
| EP | 1878917 A2 | 1/2008 |

OTHER PUBLICATIONS

European Patent Office, International Search Report issued in corresponding International Application No. PCT/DK2011/050388 dated Feb. 15, 2012, 3 pages.

* cited by examiner

*Primary Examiner* — Mark Laurenzi
*Assistant Examiner* — Anthony Ayala Delgado
(74) *Attorney, Agent, or Firm* — Wood Herron & Evans LLP

(57) ABSTRACT

A power transmission system for increasing the rotational speed from a rotor of a wind turbine comprises a main shaft configured to be driven by the rotor, a support structure, and a gearbox. The support structure includes at least one bearing supporting the main shaft for rotation about the main axis, with no other degrees of freedom between the main (Continued)

shaft and support structure. The gearbox includes a gearbox housing rigidly coupled to the support structure and a gearbox input member coupled to the main shaft. The gearbox housing supports the gearbox input member for rotation about the main axis without any other degrees of freedom, and the gearbox input member is coupled to the main shaft with translational degrees of freedom in all directions and rotational degrees of freedom about axes perpendicular to the main axis.

21 Claims, 13 Drawing Sheets

(51) Int. Cl.
    *H02K 7/18*          (2006.01)
    *F03D 15/00*        (2016.01)
    *F03D 9/25*          (2016.01)
    *F03D 13/10*        (2016.01)
    *F16H 1/46*          (2006.01)

(52) U.S. Cl.
    CPC ............. *H02K 7/1838* (2013.01); *F16H 1/46* (2013.01); *Y02E 10/725* (2013.01); *Y02E 10/728* (2013.01); *Y10T 29/49009* (2015.01)

(58) Field of Classification Search
    USPC ................................ 290/1 CC, 55; 415/124.2
    See application file for complete search history.

WIND TURBINE POWER TRANSMISSION SYSTEM

CROSS-REFERENCE

This application claims the benefit of U.S. Provisional Patent Application No. 61/393,995, filed on Oct. 18, 2010 and entitled "DRIVETRAIN FOR A WIND TURBINE". This application also claims the benefit of U.S. Provisional Patent Application No. 61/450,151, filed Mar. 8, 2011 and entitled "WIND TURBINE POWER TRANSMISSION SYSTEM".

TECHNICAL FIELD

The present invention relates to power transmission systems. More specifically, the present invention relates to power transmission systems for wind turbines.

BACKGROUND

Wind turbines typically include a rotor with large blades driven by the wind. The blades convert the kinetic energy of the wind into rotational mechanical energy. The mechanical energy usually drives one or more generators to produce electrical power. Thus, wind turbines include a power transmission system to process and convert the rotational mechanical energy into electrical energy. The power transmission system is sometimes referred to as the "power train" of the wind turbine. The portion of a power transmission system from the wind turbine rotor to the generator is referred to as the drive train.

Oftentimes it is necessary to increase the rotational speed of the wind turbine rotor to the speed required by the generator(s). This is accomplished by a gearbox between the wind turbine rotor and generator. Thus, the gearbox forms part of the power transmission system and converts a low-speed, high-torque input from the wind turbine rotor into a lower-torque, higher-speed output for the generator.

Transmitting torque is not the only function of a wind turbine power transmission system. The secondary function is to transfer other rotor loads to a nacelle structure and tower supporting the system. Indeed, the wind turbine rotor experiences a variety of loads due to variable wind conditions, dynamic interactions, control aspects, gravity, and other factors. The path of these loads through the power transmission system depends on the particular arrangement. Although components are designed with the corresponding load path in mind, the unpredictability, variety, and magnitude of the loads makes this very challenging. Moreover, even properly designed components may not accurately take into account machine tolerances, load deformations, thermal expansions/variations, and other conditions. These conditions may result in undesirable, "parasitic" forces that have the potential to damage elements in the power transmission system, particularly the gearbox components and the main bearing(s). As a result, gearbox and bearing reliability is one of the biggest concerns in the wind power industry.

Some manufacturers address gearbox concerns by designing power transmission systems without a gear stage. The wind turbine rotor directly drives a low-speed generator in such systems. Although the number of components subject to rotor loads may be reduced, these direct-drive wind turbines have the same challenges with respect to parasitic loads in main bearing(s) as well as in the generator components. Direct drive wind turbines also present other concerns. In particular, the low-speed generators are larger than their high and medium-speed counterparts in geared solutions to produce equivalent amounts of power. The larger size presents transportation, assembly, and maintenance challenges in addition to cost concerns, as most direct-drive machines are permanent magnet generators incorporating rare earth materials of limited availability. Moreover, there is also a critical requirement of low tolerances in the generator and controlled management of parasitic forces.

Thus, power transmission systems with a gear stage are still considered to be of interest, and solutions to address the reliability concerns are highly desirable.

SUMMARY

A power transmission system for increasing the rotational speed from a rotor of a wind turbine is disclosed. The power transmission system comprises a main shaft configured to be driven by the rotor, a support structure, and a gearbox. The support structure includes at least one bearing supporting the main shaft for rotation about the main axis and constraining other movements of the main shaft. Thus, other than rotation about the main axis, there are no other degrees of freedom between the main shaft and support structure.

The gearbox includes a gearbox housing rigidly coupled to the support structure and a gearbox input member coupled to the main shaft. The gearbox housing supports the input member for rotation about the main axis while constraining other movements of the gearbox input member. The gearbox input member, on the other hand, is coupled to the main shaft with translational degrees of freedom in all directions and rotational degrees of freedom about axes perpendicular to the main axis. This flexibility between the main shaft and gearbox input member plays an important role in the overall kinematics of the power transmission system. Advantageously, by combining this flexibility with the kinematic relationships characterizing the interactions between the other components, the power transmission system secures the transfer of torque in a reliable manner. Other internal forces are distributed such that the power transmission system has low sensitivity to alignment mistakes, tolerances, load deformations, thermal expansions, and other conditions that may lead to parasitic loads.

The flexibility between the main shaft and gearbox input member may be provided by a flexible coupling defined by a terminal portion associated with the main shaft, a terminal portion associated with the input member, and a coupling element. The coupling element is coupled to each of the terminal portions so as to define two joints. Each joint permits relative rotation between the coupling element and respective terminal portion around axes perpendicular to the main axis and relative translation along the main axis. As a result of such a double-joint, the flexible coupling accommodates radial, axial, and angular misalignments between the main shaft and gearbox input member.

Additional advantages may be provided by the internal distribution of forces when the gearbox housing is suspended from the support structure, which sits on top of tower when installed in a wind turbine. The support structure in such an embodiment may comprise a bearing housing surrounding the bearing(s) that support the main shaft. The gearbox housing may then be suspended directly or indirectly from the bearing housing. Thus, there is no load path through the gearbox housing to the tower. This advantage is maintained when the power transmission further includes a generator integrated with the gearbox. In particular, the generator includes a rotor and stator positioned within a generator housing, which is rigidly coupled to and suspended from gearbox housing.

These and other advantages will become more apparent based on the description below.

DETAILED DESCRIPTION

Figure 1:
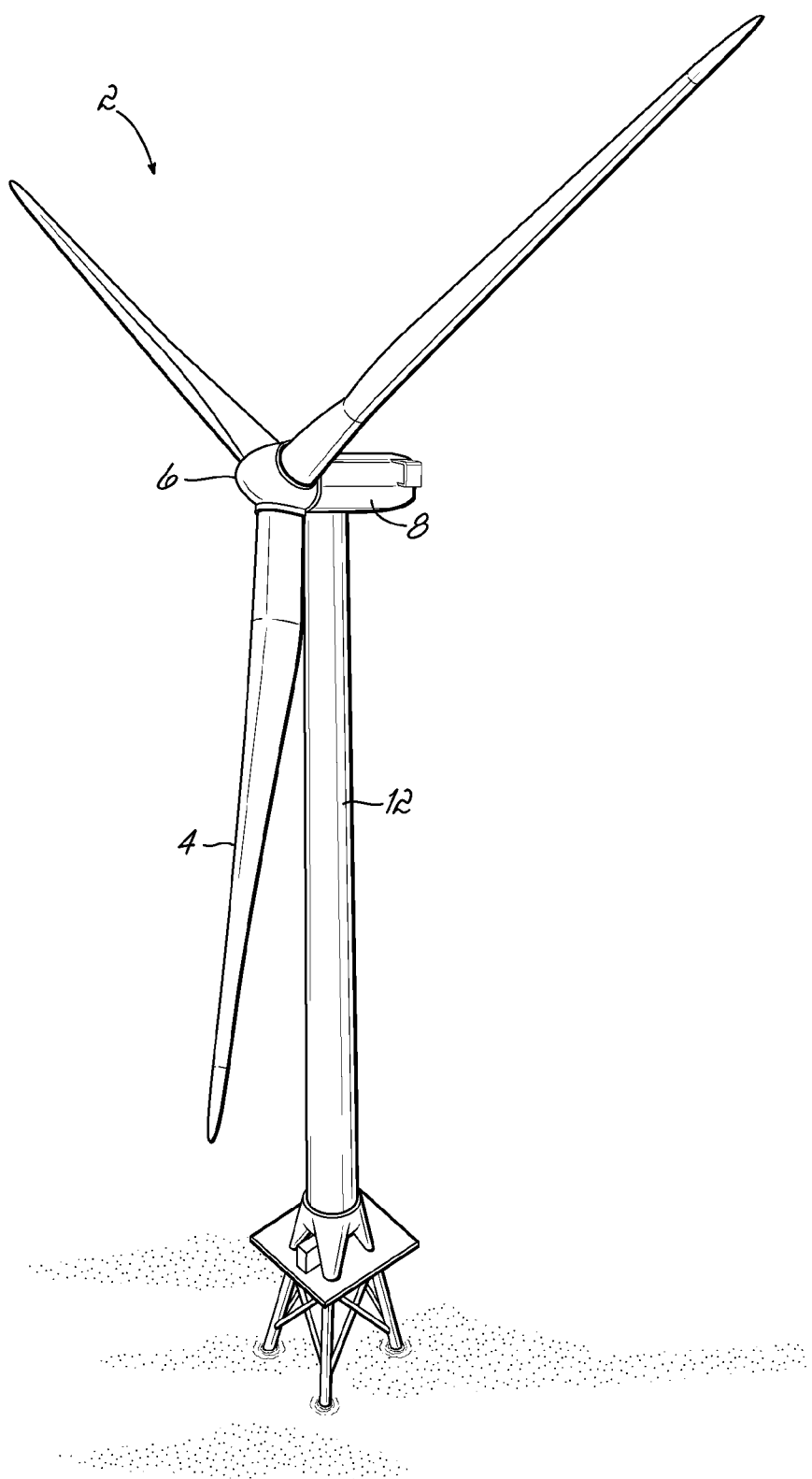
FIG. 1 is a perspective view of one example of a wind turbine.
Figure 2:
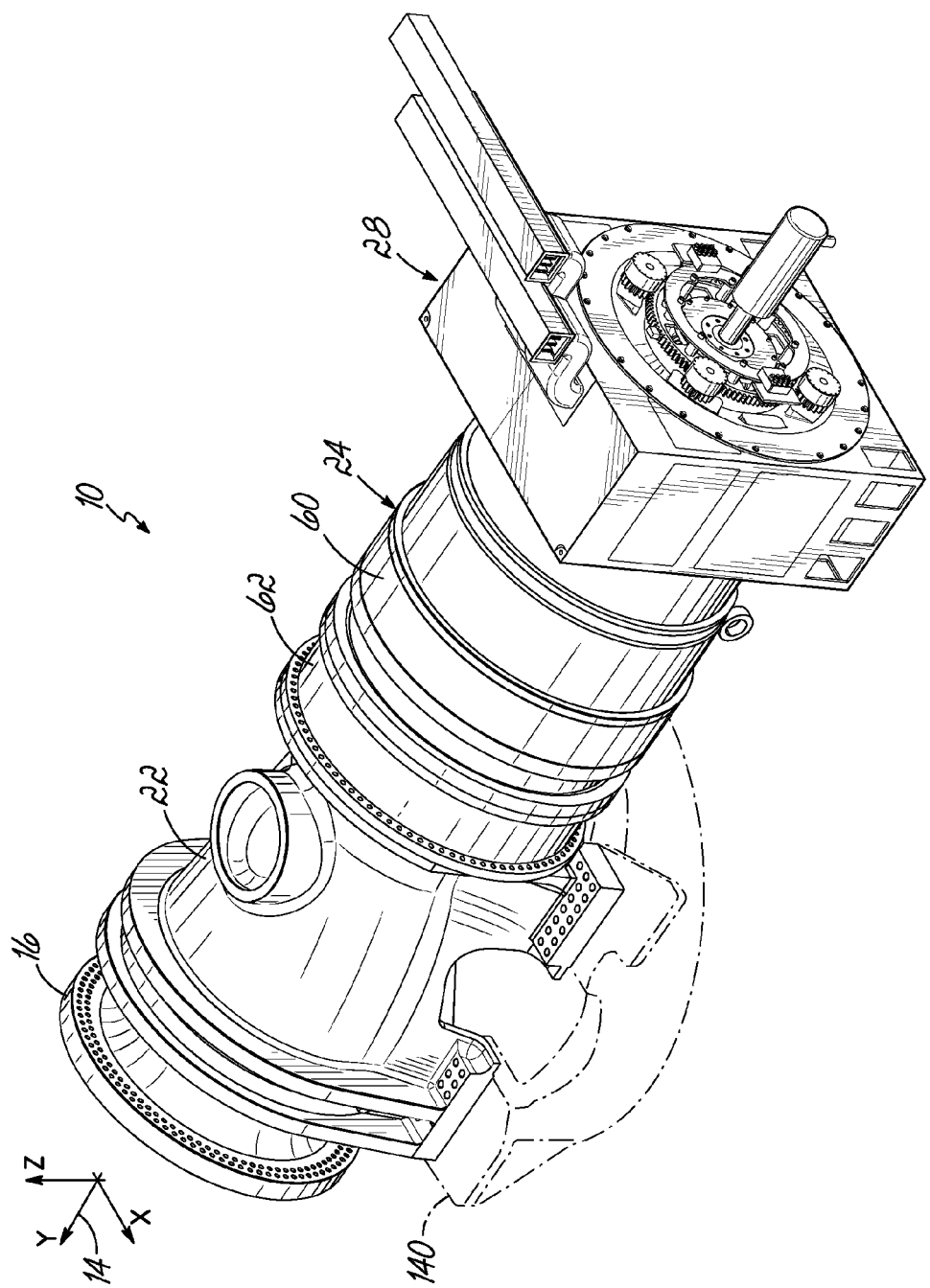
FIG. 2 is a perspective view of a power transmission system for the wind turbine of FIG. 1.

FIG. 1 shows one example of a wind turbine 2. Although an offshore wind turbine is shown, it should be noted that the description below may be applicable to other types of wind turbines. The wind turbine 2 includes rotor blades 4 mounted to a hub 6, which is supported by a nacelle 8 on a tower 12. Wind causes the rotor blades 4 and hub 6 to rotate about a main axis 14 (FIG. 2). This rotational energy is delivered to a power transmission system (or "power train") 10 housed within the nacelle 8.

Figure 3:
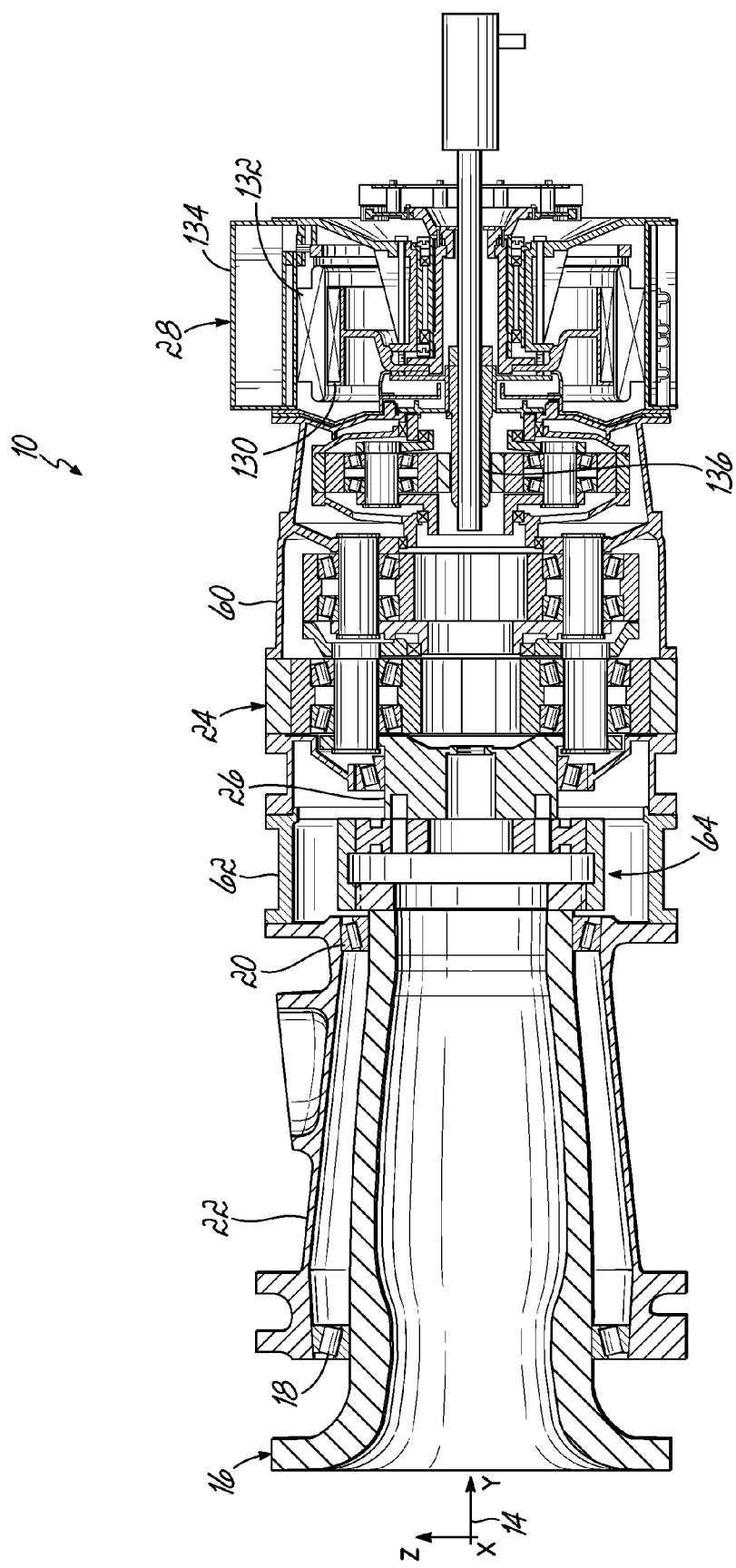
FIG. 3 is a cross-sectional view of the power transmission system of FIG. 2.

As shown in FIGS. 2 and 3, the power transmission system 10 includes a main shaft 16 coupled to the hub 6 (FIG. 1). The power transmission system 10 also includes first and second bearings 18, 20 supporting the main shaft 16, a bearing housing 22 surrounding the first and second bearings 18, 20, and a gearbox 24 having a gearbox input member 26 driven by the main shaft 16. The gearbox 24 increases the rotational speed of the main shaft 16 to drive a generator 28, as will be described in greater detail below.

The kinematics of the power transmission system 10 will also be described in greater detail below. For this purpose, it will be convenient to make reference to a three-dimensional coordinate system based upon the main axis 14. In this coordinate system, the y-axis is considered to be the main axis of the system. The x-axis and z-axis are perpendicular to the y-axis, with the z-axis being generally aligned with the gravitational direction. The relationships between kinematic bodies will be described in terms of degrees of freedom. A "body" is a single element or group of elements substantially rigidly connected such that distances between points in the body are effectively fixed under normal conditions. Stated differently, all elements of a body effectively move together with respect to the same reference system under normal conditions; relative movement is not intended. A "degree of freedom" refers to the ability of one body to move in translational or rotational directions relative to another body to which it is joined. The joint is specifically designed with relative movement in mind when there is one or several degree(s) of freedom. The translational and rotational directions are defined with reference to the coordinate system.

Figure 4:
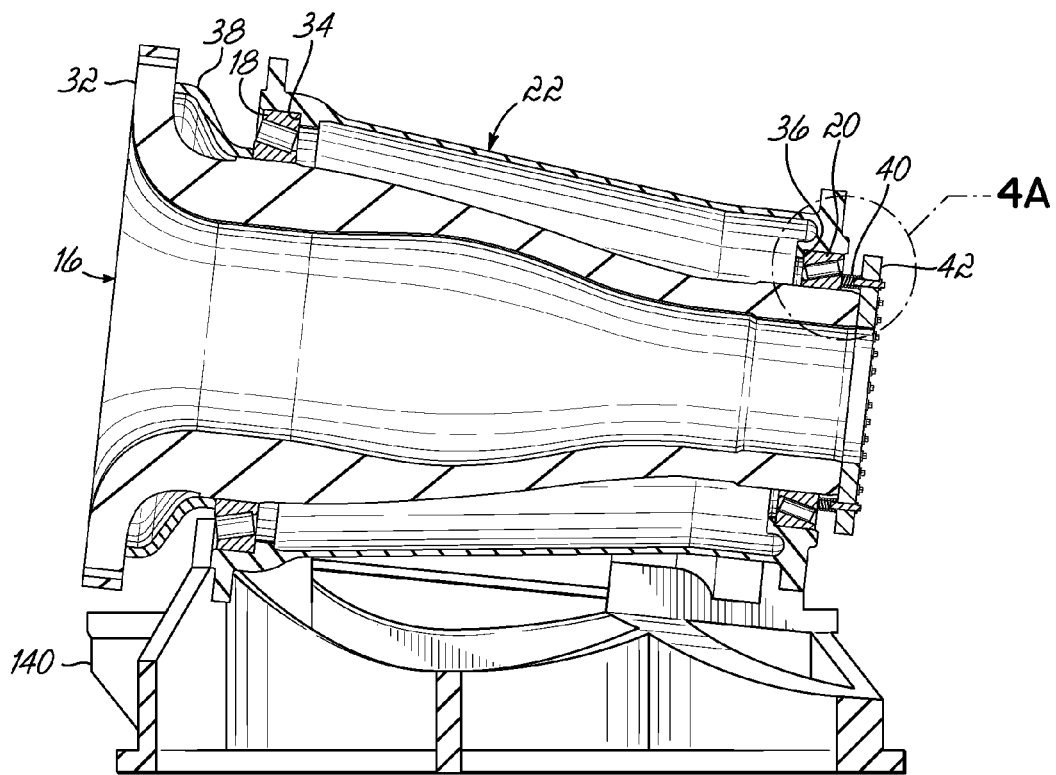
FIG. 4 is a cross-sectional view of a portion of the power transmission system in further detail.

Now turning to FIG. 4, a portion of the power transmission system 10 is shown in cross-section. As can be seen, the main shaft 16 is hollow and includes a flange portion 32 at the end connecting to the hub 6 (FIG. 1). The flange portion 32 enables the main shaft 16 to be coupled to the hub with bolts. In other embodiments, the main shaft 16 may be coupled to the hub by a hirth connection, a combined pin bolt connection, or some other arrangement that ensures the transfer of torque. Furthermore, although the flange portion 32 is shown as being formed integrally with the rest of the main shaft 16, it may alternatively be a separate component bolted or otherwise secured to the main shaft 16.

The first and second bearings 18, 20 support the main shaft 16 for rotation about the y-axis 14 but prevent other relative motions between the bearing housing 22 and main shaft 16. A wide-spread tapered roller bearing arrangement is shown. In particular, the first and second bearings 18, 20 are single-row tapered roller bearings spaced apart within the bearing housing 22 and arranged in an O-configuration; the forces normal to the rolling elements are converge outside of the space between the bearings (thereby creating an effective spread larger than the distance between the bearings). Other bearing arrangements are also possible. For example, the main shaft 16 may alternatively be supported by some combination of cylindrical roller bearings, spherical roller bearings, or tapered roller bearings, each with either a single row or multiple rows of roller elements.

The main bearing housing 22 further includes shoulders 34, 36 to help position the first and second bearings 18, 20 in the axial direction. A first pre-tensioning element 38 extends between the flange portion 32 of the main shaft 16 and the first bearing 18. The first pre-tensioning element 38 may be a sleeve sized so that the first bearing 18 is pushed against the shoulder 34 in the main bearing housing 22. Similarly, a second pre-tension element 40 may extend between the second bearing 20 and a coupling flange 42 at the other end of the main shaft 16. The second pre-tensioning element 40 may likewise be a sleeve sized so that the second bearing 20 is pushed against the shoulder 36.

Figure 4A:
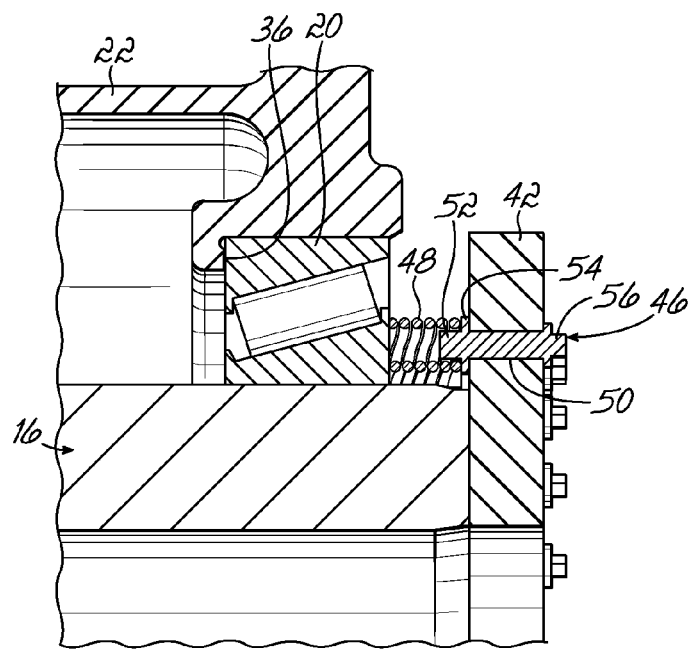
FIG. 4A is a cross-sectional view of one embodiment of a pre-tensioning element for a bearing in the power transmission system.

In some embodiments, the first and/or second pre-tensioning elements 38, 40 may be adjustable. For example, FIG. 4A illustrates an embodiment of a second pre-tensioning element 40 defined by bolts 46 and springs 48. The bolts 46 extend through threaded holes 50 in the coupling flange 42 and include caps or heads 52 on the end facing the second bearing 20. A flange-like portion 54 of the cap 52 extends in a radial direction, thereby defining a surface that faces the second bearing 20. The springs 48 fit over the other portion of the cap 52 and extend between these surfaces and the second bearing 20. Forces exerted by the springs 48 pre-load the second bearing 20 in the axial direction.

The pre-load in the embodiment of FIG. 4A may be adjusted by changing the position of the bolts 46. To this end, the bolts 46 may include a head or terminal portion 56 on the other side of the coupling flange 42 allowing the bolts to be rotated. For example, the bolts 46 may be threaded studs with a hex end on this side of the coupling flange 42. Rotating the bolts 46 changes their axial position and the amount by which the springs 48 are compressed.

The first pre-tensioning element 38 may be constructed similar to the second pre-tensioning element 40 shown in FIG. 4A, if desired. Variants of the embodiments described above will be appreciated by persons skilled in wind turbine bearing design. For example, the individual springs 48 in FIG. 4A may be replaced by individual, resilient sleeves. Alternatively, rather than there being one spring 48 per bolt 46, there may be a tubular sleeve extending around the main shaft 16 and received over all of the caps 52 (the sleeve's inner and outer diameters abutting each of the flange-like portions 54). The number of different embodiments that will be appreciated is why the first and second pre-tensioning elements 38, 40 are shown schematically in FIG. 4 (note: they are not shown in FIGS. 2 and 3 for simplicity).

Regardless of the particular construction, the first and second pre-tensioning elements 38, 40 cooperate with the flange portion 32 and coupling flange 42 to secure the first and second bearings 18, 20 in position against the shoulders 34, 36. Such an arrangement eliminates the need for notches on the main shaft 16, which simplifies the manufacturing process for the main shaft 16 and does not compromise its strength. Moreover, the pre-load ensures both the first and second bearings 18, 20 experience at least some minimum load under all operating conditions. This reduces or eliminates unwanted axial movements, maximizes stiffness in the overall system, and optimizes bearing use in that the load zones of rolling elements are increased as a function of the pre-load.

Now referring back to FIG. 3, the gearbox 24 is suspended from the bearing housing 22 and main shaft 16; there is no support for the gearbox 24 itself. More specifically, the gearbox 24 includes the gearbox input member 26, which is coupled to the main shaft 16, and a gearbox housing 60, which is suspended from the bearing housing 22. This suspension need not be direct. Indeed, in the embodiment shown, a coupling housing 62 connects the gearbox housing 60 to the main bearing housing 22 and surrounds the interface between the main shaft 16 and gearbox input member 26. Accordingly, the gearbox housing 60 is suspended from the bearing housing 22 via the coupling housing 62. Stated differently, the gearbox housing 60 is only supported at one end and, therefore, cantilevered from the bearing housing 22 via the coupling housing 62.

This particular arrangement has advantages that will be more apparent based on the description below. Those skilled in wind turbine design, however, will appreciate other arrangements having the same kinematic relationship. For example, the rigidly connected elements supporting the main shaft 16 (e.g., the first and second bearings 18, 20 and the bearing housing 22) can more generally be referred to as a "support structure" and considered part of the same kinematic body. The gearbox housing 60 is also part of this kinematic body because it is rigidly coupled to the bearing housing 22. With this in mind, other embodiments where a gearbox is rigidly coupled to the same structure supporting a main shaft, such as a base frame, will be apparent. There need not necessarily be suspension unless the particular advantages associated with the suspension arrangement (described below) are desired. On a more general level, the associated kinematic body has two joints: a first one with the main shaft 16, and a second one with the gearbox input member 26. The first joint (the support of the main shaft 16) has already been described. In terms of the second joint, the gearbox housing 60 (and, therefore, its associated kinematic body) supports the gearbox input member 26 for rotation about the main axis 14 and inhibits other relative movements.

The type of gearbox input member 26 depends on the particular gearbox design. A planet carrier for a differential gearbox is shown, although details of the differential gearbox are not illustrated because other gearbox design suitable for wind turbines may be used instead. This includes, for example, conventional planetary gearboxes, compound planetary gearboxes, fixed carrier planetary gearboxes, etc. involving single or multiple stages. Regardless of the gearbox design, the gearbox input member 26 is flexibly coupled to the main shaft 16. There are different ways in which this may be achieved, and several examples will be described below. Each involves a flexible connection or coupling 64 such that the main shaft 16 and gearbox input member 26 are not rigidly connected; they are different kinematic bodies joined at the coupling 64. Advantageously, the coupling 64 provides translational degrees of freedom in all directions and rotational degrees of freedom only about the x-axis and z-axis. There is no rotational degree of freedom about the y-axis (main axis) because the coupling 64 is torsionally stiff.

Figure 5:
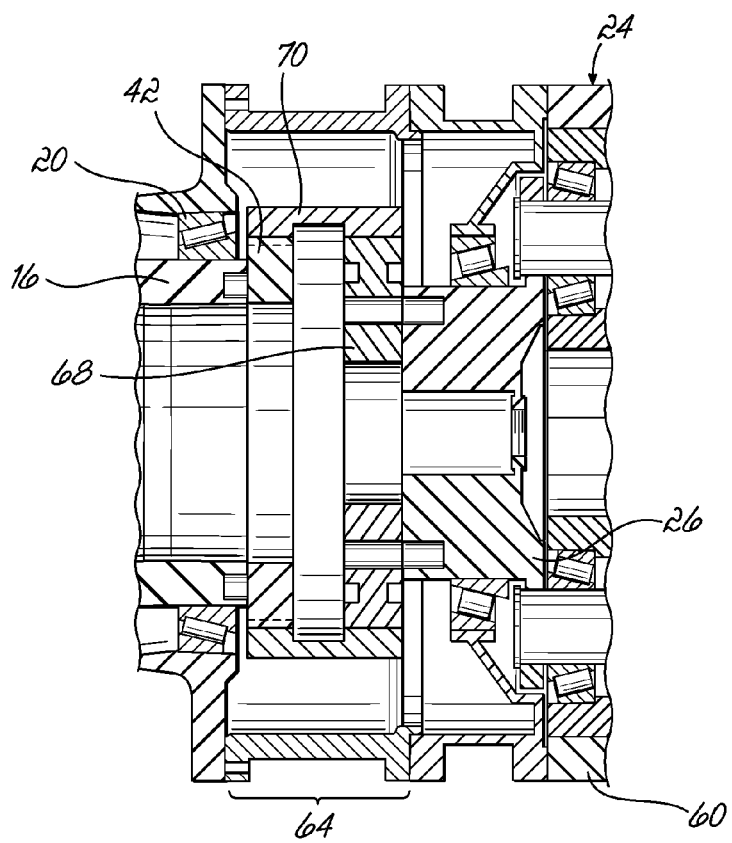
FIG. 5 is a cross-sectional view showing a coupling in the power transmission system of FIG. 3 in further detail.
Figure 6:
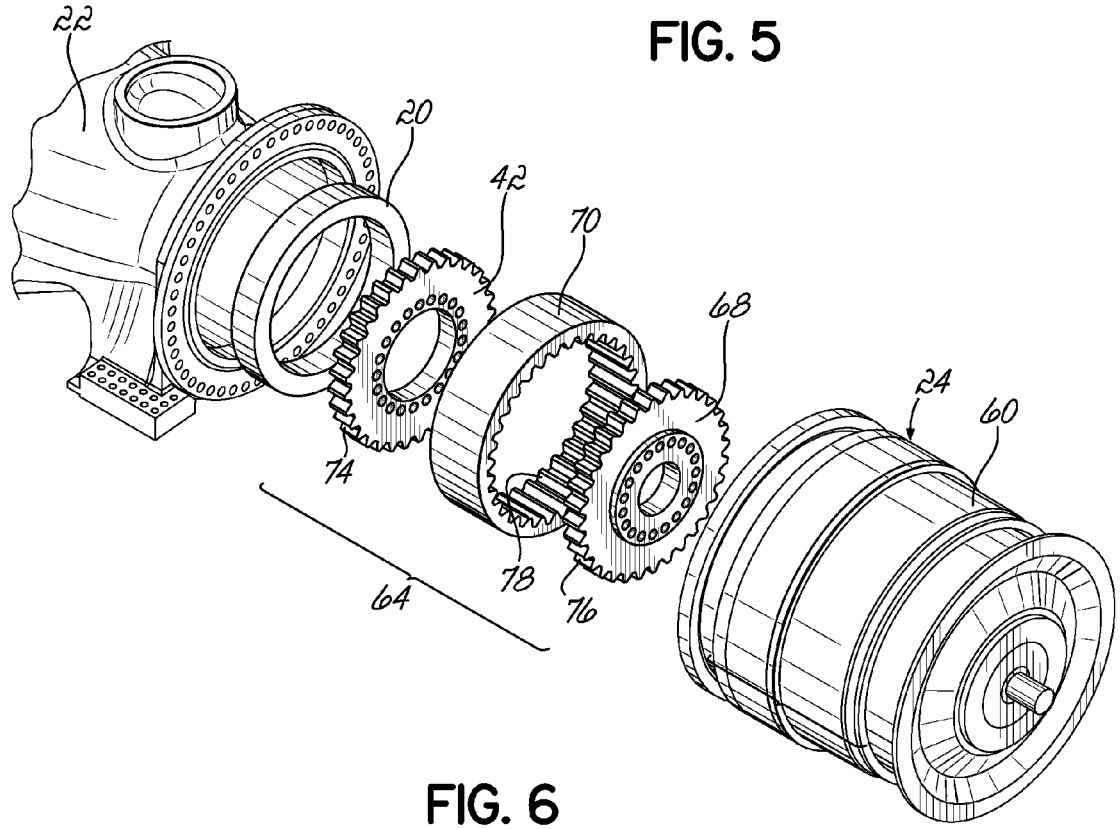
FIG. 6 is an exploded perspective view of the coupling shown in FIG. 5

FIGS. 5 and 6 show one embodiment of the coupling 64 in further detail. In this embodiment, the coupling 64 is a curved spline tooth coupling defined by the coupling flange 42 of the main shaft 16, a coupling flange 68 of the gearbox input member 26, and a coupling element 70 circumferentially engaging the coupling flanges 42, 68. The coupling flanges 42, 68 are shown as separate components bolted to the main shaft 16 and gearbox input member 26, respectively. As a result, the coupling flanges 42, 68 rotate with these components. Pins (not shown) extend between each coupling flange 42, 68 and the component to which it is bolted at various locations to help transfer torque. The connection may be additionally or alternatively supported by placing a friction plate (not shown) between each coupling flange 42, 68 and the component to which it is secured. The friction plate may be, for example, a metal disc coated with a friction-enhancing material. Torque is a function of forces causing rotation about the main axis 14 and distance from the main axis 14. Therefore, increasing the ability to transfer torque by means of the pins and/or friction plates enables larger forces to be transferred through the connections without having to increase the diameter of the main shaft 16 or gearbox input member 26. In alternative embodiments, the coupling flanges 42, 68 may be integrally formed with the main shaft 16 and gearbox input member 26, respectively.

Figure 7A:
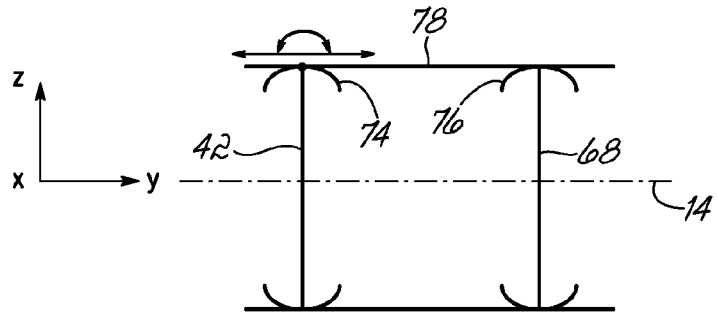
FIGS. 7A-7D are schematic views of the coupling shown in FIG. 5.

As shown in FIG. 6, the coupling flanges 42, 68 terminate in radially-outward projecting teeth 74, 76. The coupling element 70 includes radially-inward projecting teeth 78 to engage the teeth 74, 76. Therefore, two gear meshes are defined. There are equal numbers of teeth on the coupling flanges 42, 68 and coupling element 70 such that there is a 1:1 gear ratio. One set of teeth in each gear mesh have substantially straight profiles, while the other set have profiles crowned in an axial direction. This is illustrated schematically in FIG. 7A.

In the embodiment shown in FIGS. 5 and 6, the teeth 74, 76 on the coupling flanges 42, 68 are the ones with a crowned profile. The teeth 78 on the coupling element 70 have straight profiles and extend along its length to mesh with the teeth 74, 76. As a result of this arrangement, the coupling 64 functions a double-joint that can accommodate different types of misalignments. More specifically, the coupling 64 can be broken down into three kinematic bodies: the main shaft 16 (including the coupling flange 42), the coupling element 70, and the gearbox input member 26 (including the coupling flange 68). A joint is defined between each coupling flange 42, 68 and the coupling element 70. In this particular embodiment, the joints are gear meshes (other examples will be described). Each joint permits relative rotation around the x-axis and z-axis because the crowned teeth 74, 76. Relative translation in an axial direction (i.e., along the main axis 14) is also permitted because the straight teeth 78 do not constrain the crowned teeth 74, 46 in this direction. The joints are not designed for other relative movements.

Figure 7B:
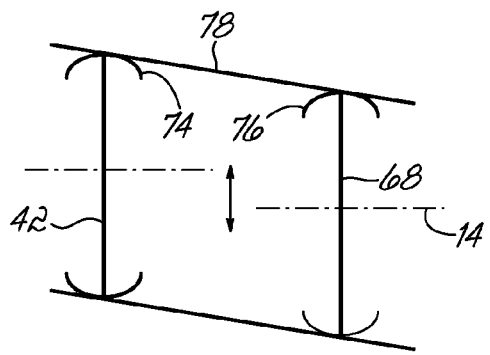
Figure 7C:
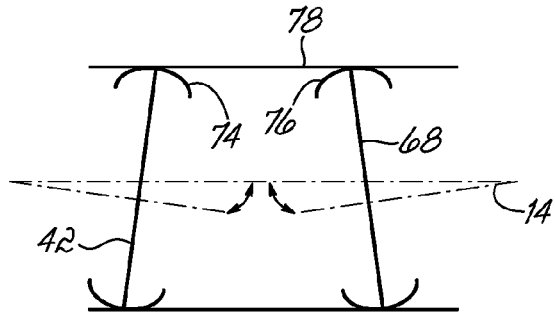
Figure 7D:
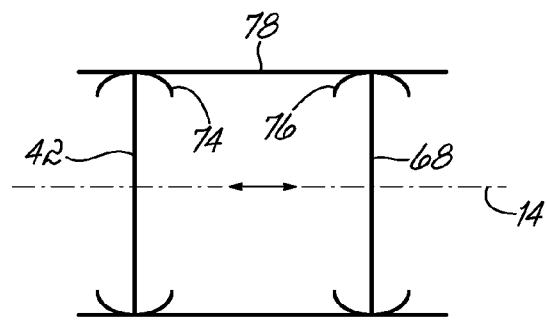

This kinematic relationship is what provides the coupling 64 with translational degrees of freedom in all directions and rotational degrees of freedom about the x-axis and z-axis. As can be appreciated from the schematic drawings in FIGS. 7A-7D, if the main shaft 16 (represented by the coupling flange 42) becomes misaligned with the gearbox input member 26 (represented by the coupling flange 68) in a radial direction (offset along x or z-axis; FIG. 7B), angular direction (FIG. 7C), and/or axial direction (offset along y-axis; FIG. 7D), the relative translations and rotations described above accommodate these misalignments. When this kinematic relationship is combined with the other relationships in the power transmission system 10 (the number of kinematic bodies, number of joints, and degrees of freedom), the system has low sensitivity to alignment mistakes, tolerances, load deformations, thermal expansions, and other conditions that might otherwise lead to misalignments and unwanted, "parasitic" forces damaging sensitive components. Therefore, the power transmission system 10 is able to accomplish its primary function—the transfer of torque—in a reliable manner.

Figure 8:
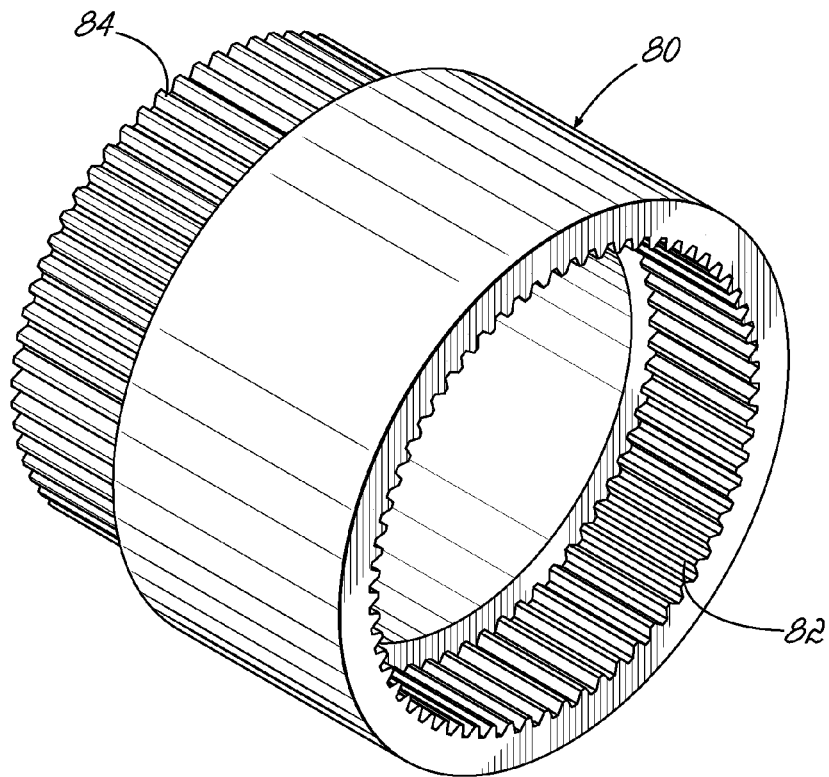
FIG. 8 is a perspective view of a coupling element for a coupling in the power transmission system according to an alternative embodiment.

The coupling flanges 42, 68 represent terminal portions of the main shaft 16 and gearbox input member 26. In alternative embodiments not shown, the terminal portions may simply be extensions of the main shaft 16 and gearbox input member 26 provided with radially-projecting teeth. Moreover, the radially-projecting teeth on the terminal portions need not be in the same direction. For example, FIG. 8 shows a coupling element 80 that may be used in such alternative embodiments. Rather than being a ring spline (like the coupling element 70) surrounding terminal portions of the main shaft 16 and gearbox input member 26, the coupling element 80 includes a first set of teeth 82 projecting radially-inward and a second set of teeth 84 projecting radially-outward. One of the terminal portions (e.g., an extension or coupling flange of the main shaft 16 or gearbox input member 26) engages the first set of teeth 82, while the other one engages the second set of teeth 84. One set of teeth in each gear mesh have substantially straight profiles and the other set have profiles crowned in an axial direction. Thus, although the first and second sets of teeth 82, 84 have straight profiles in FIG. 8, they may alternatively be the ones with crowned profiles.

Figure 8A:
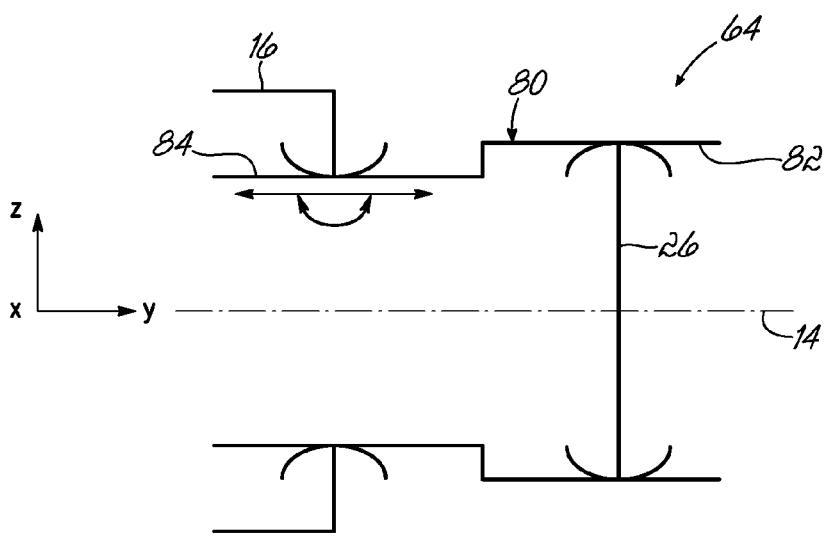
FIG. 8A is a schematic view of the coupling for the embodiment of FIG. 8.

The same kinematic relationships are maintained in FIG. 8 as in the embodiment of FIGS. 3-7. That is, the coupling element 80 represents one kinematic body having joints with two other bodies (the main shaft 16 and gearbox input member 26). This can be appreciated from the schematic view in FIG. 8A. Each joint permits relative rotation around the x-axis and z-axis and relative translation along the y-axis. Again, this is a result of one set of teeth in each gear mesh having crowned profiles and the other having straight profiles; the same principles as the embodiment in FIGS. 3-7. The overall result is still a coupling srrangement that provides translational degrees of freedom in all directions and rotational degrees of freedom about the x-axis and z-axis. The coupling is not designed for other relative movements. Accordingly, the advantages mentioned above still apply.

The advantages mentioned above also apply to other embodiments not involving curved tooth gear meshes. Indeed, there are number of ways of providing the coupling 64 with the same kinematic relationships between the main shaft 16, a coupling element, and the gearbox input member 26.

Figure 9:
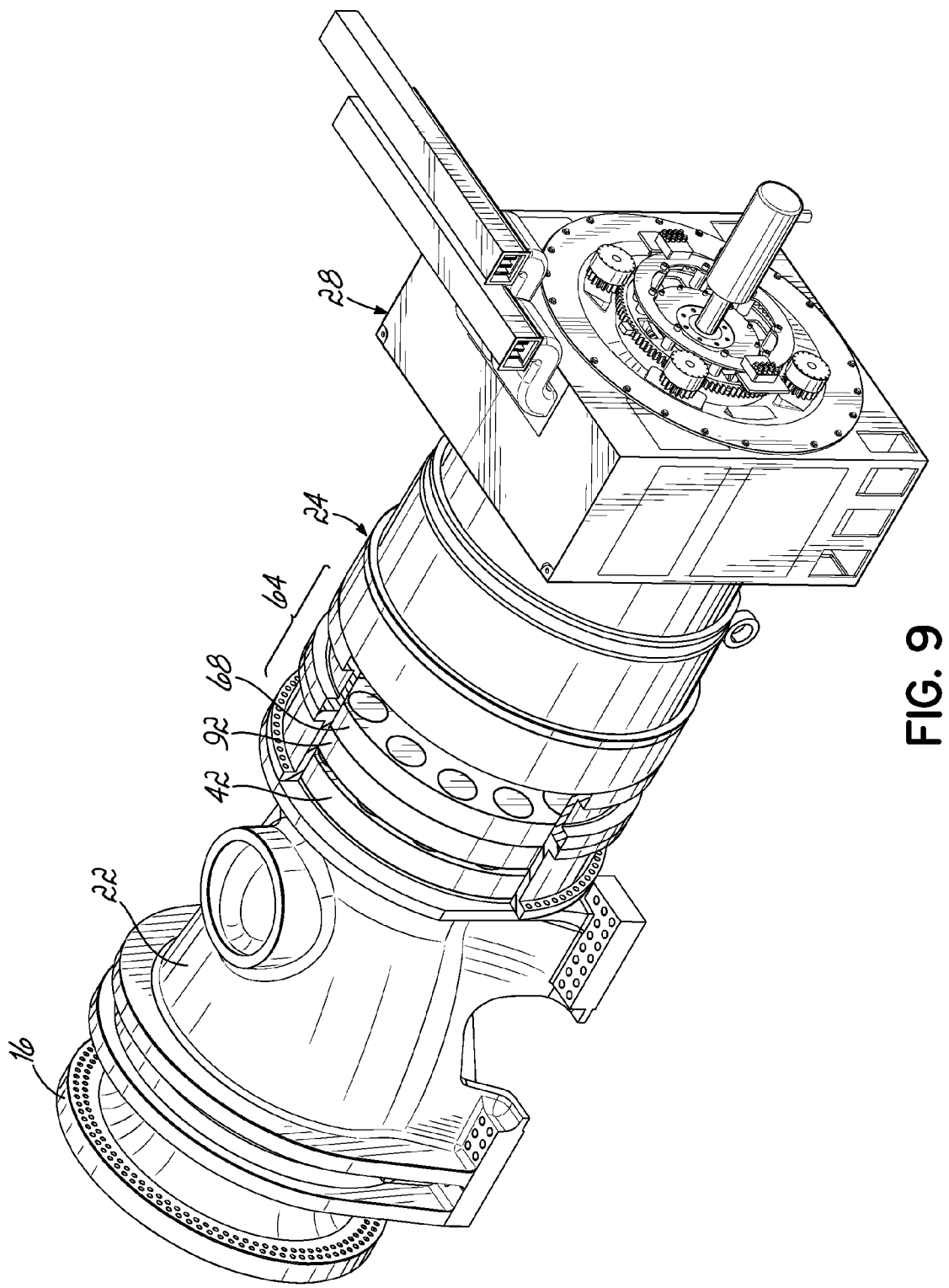
FIG. 9 is a perspective view of a power transmission system with a coupling according to yet another embodiment.
Figure 10:
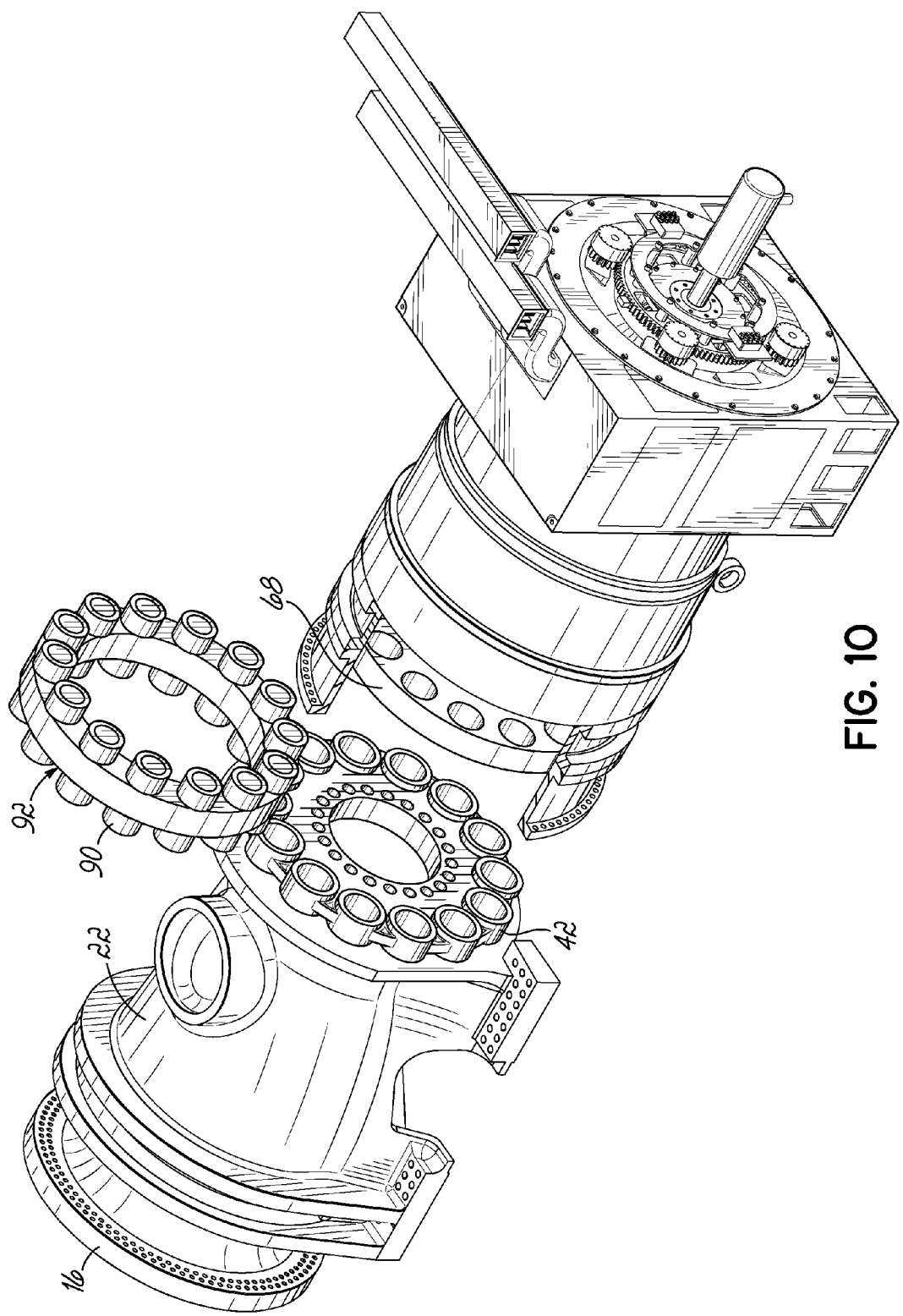
FIG. 10 is an exploded perspective view of the power transmission system of FIG. 9.
Figure 11:
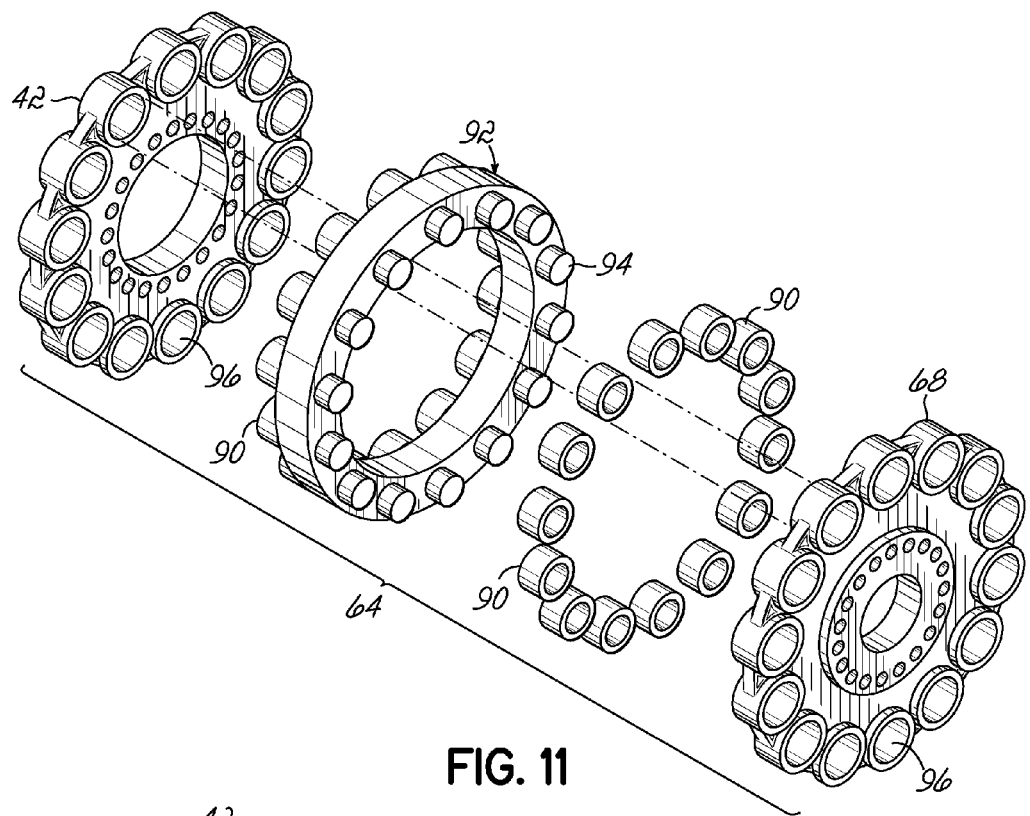
FIG. 11 is an exploded perspective view of the coupling in the power transmission system of FIG. 9.

FIGS. 9-11 illustrate an alternative embodiment where the coupling 64 incorporates joint elements made from a flexible material, such as rubber. More specifically, the coupling 64 includes a coupling element 92 positioned between the coupling flange 42 and the coupling flange 68. A plurality of pins 94 project from opposite sides of the coupling element 92 in the axial direction. The pins 94 may be press-fit into holes or otherwise secured to the coupling element 92, or they may be integrally formed with the coupling element 92. In this embodiment, the joint elements incorporated into the coupling 64 are rubber bushings 90 received on the pins 94. The bushings 90 may be press-fit onto the pins 94, which are then inserted into holes 96 provided in the coupling flanges 42, 68. A loose-fit connection may be provided between the holes 96 and the bushings 90 when the pins 94 are positioned in this manner.

Advantageously, the bushings 90 allow some angular and axial movement between the pins 94 and holes 96. As such, the same kinematic relationships discussed above are maintained. The coupling element 92 via the pins 94 on one side has a joint with the coupling flange 42 (and, therefore, the main shaft 16), and via the pins 94 on the other side has a joint with the coupling flange 68 (and, therefore, the gearbox input member 26). Each of these two joints permits relative rotation around the x-axis and z-axis and relative translation along the y-axis. Other relative movements are constrained. Again, the overall result is still a coupling 64 between the main shaft 16 and gearbox input member 26 that provides translational degrees of freedom in all directions and rotational degrees of freedom only about the x-axis and z-axis. The location and size of the pins 94, together with the size and material of the bushings 90, can be optimized according to the desired parameters (e.g., acceptable level of parasitic forces, size and mass of the coupling 64, lifetime of the bushings 90, etc.).

Figure 11A:
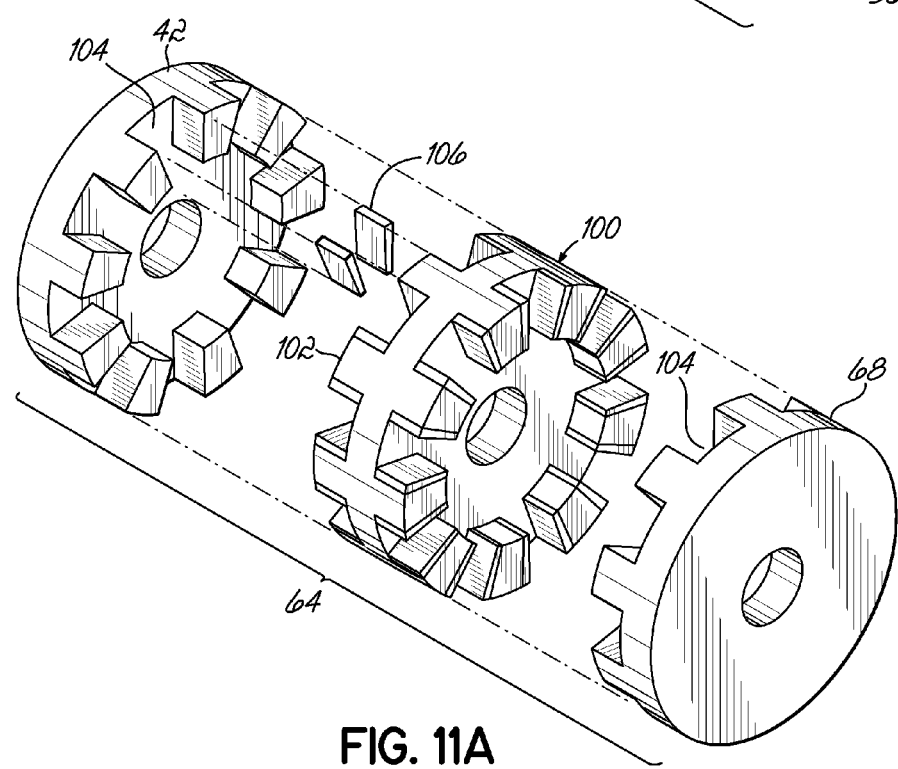
FIG. 11A is a perspective view of an coupling according to another embodiment, but based on similar principles as the coupling in FIG. 11.

Other embodiments incorporating joint elements constructed from a flexible material will be appreciated based on the above description. They need not involve pins and rubber bushings. Indeed, FIG. 11A is a schematic view of an alternative embodiment where a coupling element 100 includes block-like projections 102 and the coupling flanges 42, 68 include corresponding recesses 104 for the projections 102. The joint elements in this embodiment are rubber pads 106 positioned between the projections 102 and recesses 104. The rubber pads 106 function in the same manner as the rubber bushings 90 in FIG. 11, providing the same degrees of freedom between the coupling element 100 and coupling flanges 42, 68 (and, therefore, main shaft 16 and gearbox input member 26).

Figure 12:
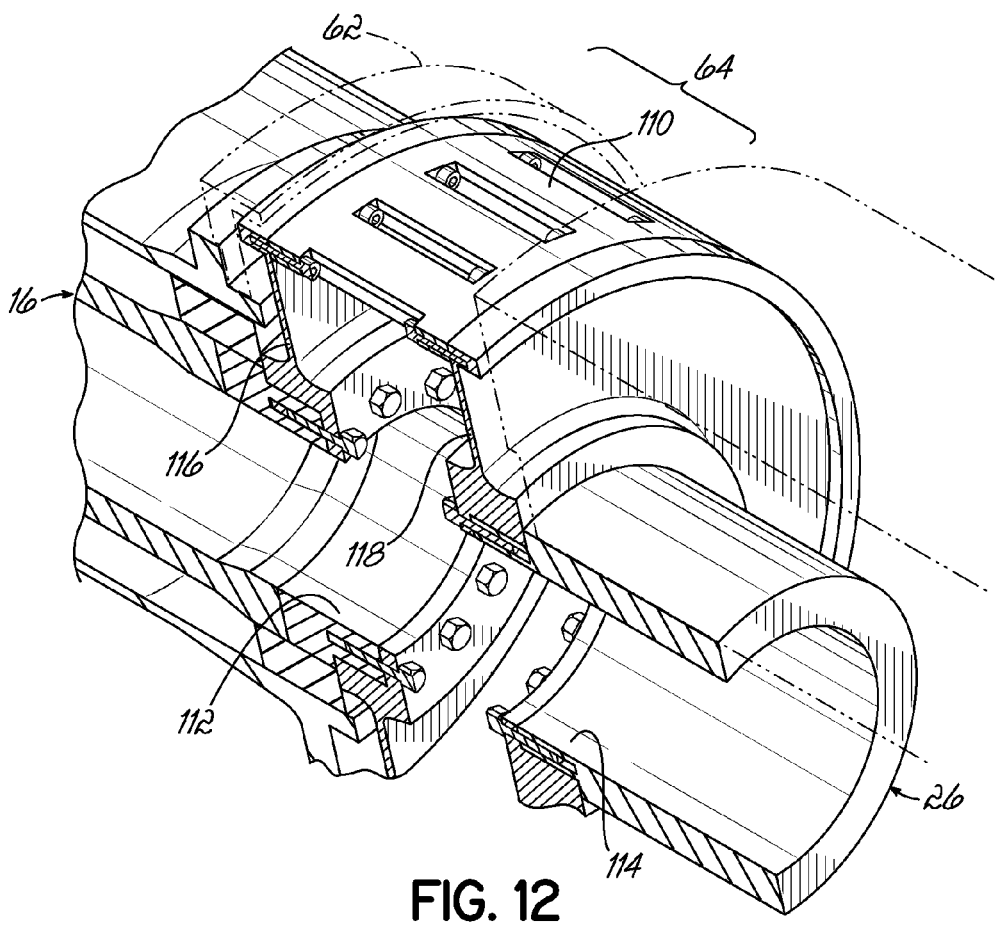
FIGS. 12 and 13 are schematic views of a power transmission system with a coupling according to yet another embodiment.
Figure 13:
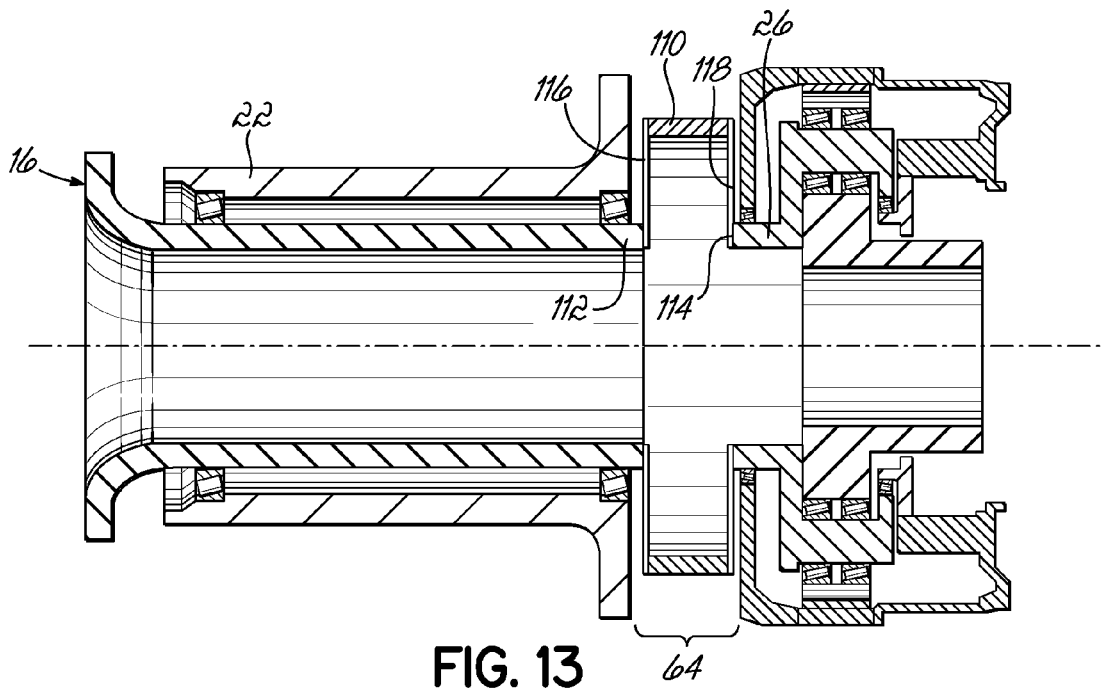

FIGS. 12 and 13 schematically illustrate an embodiment not including curved tooth gear meshes or rubber joint elements. In this embodiment, the coupling 64 includes a coupling element 110 in the form of a rigid tube positioned between a terminal portion 112 of the main shaft 16 and a terminal portion 114 of the gearbox input member 26. The coupling element 110 has an inner diameter greater than the terminal portions 112, 114 such that it effectively surrounds them. Each of the terminal portions 112, 114 is coupled to the coupling element 110 by one or more flexible discs. In the embodiment shown, a first disc 116 has an inner diameter coupled to the main shaft 16 and outer diameter coupled to the coupling element 110. A second disc 118 has an inner diameter coupled to the gearbox input member 26 and outer diameter coupled to the coupling element 110. The connection between each of the first and second discs 116, 118 and the respective terminal portions 112, 114 may be a pin-bolt connection (like for the coupling flanges 42, 68, as discussed above) or any other suitable connection. The first and second discs 116, 118 may have a slightly increased thickness in this connection area. These variations are shown in FIG. 12, but not FIG. 13 for sake of simplicity.

In general, the first and second discs 116, 118 each have an outer diameter that is substantially greater than their respective thicknesses. Moreover, the outer diameter is substantially greater than the associated inner diameter. This geometric relationship and/or the materials provide the first and second discs 116, 118 with flexibility in certain directions. In particular, a thin disc like the first and second discs 116, 118 is much more rigid in the radial direction than in the axial direction. Such a disc can flex to allow its inner diameter to move relative to the outer diameter in the axial direction. The disc can also flex to allow its inner diameter to twist (i.e., rotate) relative to the outer diameter about axes perpendicular to the axial direction. Suitable materials for the first and second discs 116, 118 include, without limitation: metals (e.g., iron, steel, titanium), composite materials (e.g., glass fibers and resins), carbon-reinforced plastic materials, or combinations thereof.

With the flexibility of the first and second discs 116, 118 in mind, the coupling 64 can be viewed in the same manner as the other embodiments discussed above: as involving three kinematic bodies (the main shaft 16, coupling element 110, and gearbox input member 26). The first disc 116 defines a joint between the main shaft 16 and coupling element 110. The second disc 118 defines a joint between the coupling element 110 and gearbox input member 26. Each of these joints has a translational degree of freedom along the y-axis and rotational degrees of freedom about the x-axis and z-axis. Other relative movements are constrained.

As can be appreciated, there are many different ways of providing a coupling 64 that kinematically joins the main shaft 16 to the gearbox input member 26 with translational degrees of freedom in all directions and rotational degrees of freedom about axes perpendicular to the main axis. The examples discussed above do so using a coupling element with two separate joints. As previously mentioned, combining the kinematic relationship provided by the coupling 64 with the other kinematic relationships (the particular number of kinematic bodies, joints between the bodies, and degrees of freedom) secures the transfer of torque with a minimum amount of potentially-damaging, parasitic forces.

Referring back to FIGS. 2 and 3, the power transmission system 10 not only achieves this primary function in an advantageous manner, but also achieves its secondary function—the transfer of loads other than torque from a rotor to a tower—in a way that provides several advantages. The gearbox housing 60 is suspended from the bearing housing 22 via the coupling housing 62, as discussed above. The generator 28 may also be suspended by being coupled to the gearbox 24. More specifically, the generator includes a generator rotor 130 and stator 132 positioned within a generator housing 134. The generator rotor 130 is driven by a gearbox output member 136 and supported for rotation within the generator housing 134. The stator 132 is rigidly coupled to the generator housing 134, which in turn is rigidly coupled to and suspended from the gearbox housing 60. Further details relating to the generator itself are described a PCT patent application filed concurrently herewith, also entitled "WIND TURBINE POWER TRANSMISSION SYSTEM" and having Applicant's file ref. no. 2010P00199WO, the disclosure of which is fully incorporated herein by reference.

Figure 14:
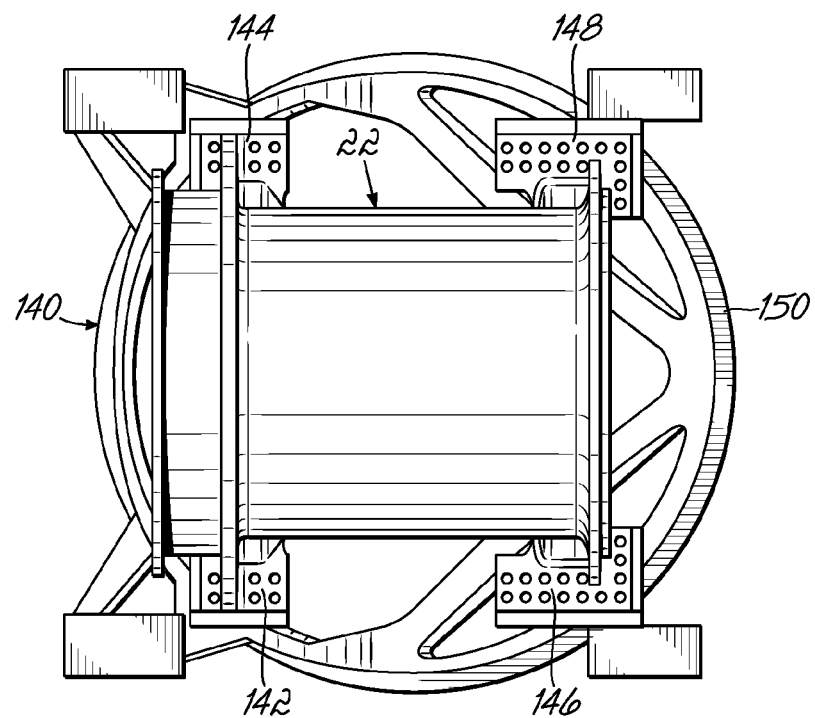
FIG. 14 is a top elevational view of a portion of the power transmission system of FIG. 2.
Figure 15:
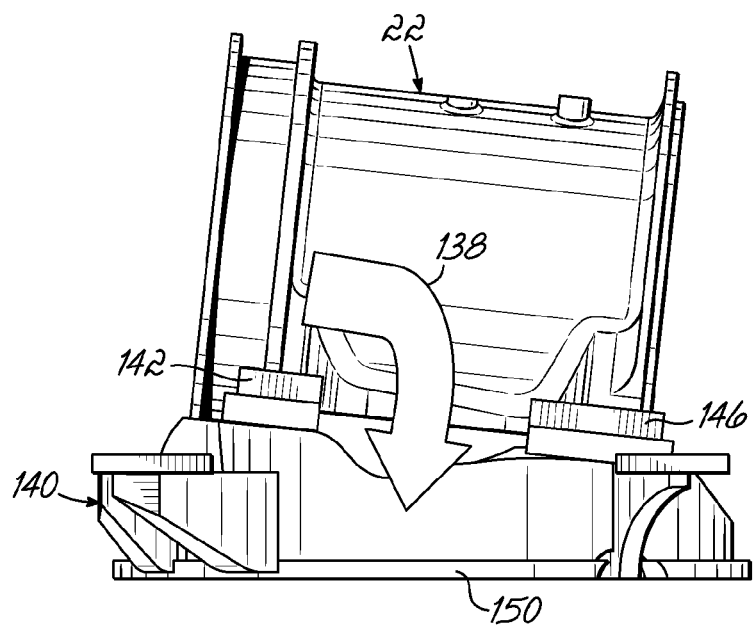
FIG. 15 is a side elevational view of a portion of the power transmission system of FIG. 2.

With no support for the gearbox 24 or generator 28, the only load path through the power transmission system 10 to the tower 12 (FIG. 1) on which it is placed is through the bearing housing 22 and a base frame 140 (FIG. 14). This is schematically illustrated by arrow 138 in FIG. 15. As shown in FIGS. 14 and 15, the bearing housing 22 may include first and second support legs 142, 144 positioned proximate the first bearing 18, and third and fourth support legs 146, 148 positioned proximate the second bearing 20. The first, second, third, and fourth support legs 142, 144, 146, 148 are mounted on the base frame 140, which is shaped in a particular manner to distribute the loads it receives from the bearing housing 22. Advantageously, the base frame 140 distributes the loads across a circular bottom 150. This reduces stress concentrations in a yaw system (not shown) that attaches the base frame 140 to the tower 12. Further details relating to the shape of the bearing housing 22 and distribution of forces are described in U.S. Provisional Patent Application No. 61/532,595, filed Sep. 9, 2011 and entitled "WIND TURBINE ROTOR SHAFT SUPPORT STRUCTURE", the disclosure of which is fully incorporated herein by reference.

Figure 16:
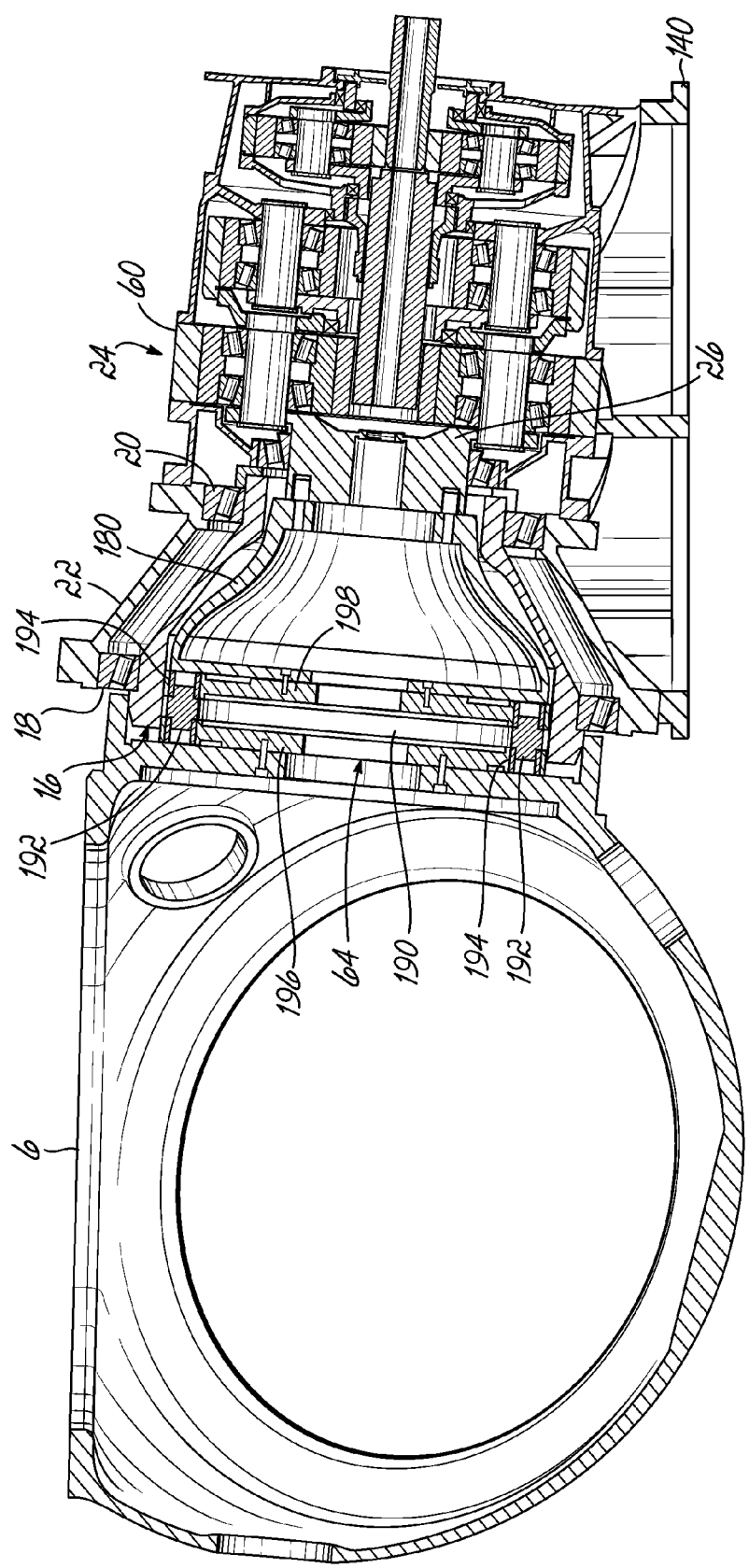
FIG. 16 is a cross-sectional view of a portion of a power transmission system according to an alternative embodiment.

The embodiments described above are merely examples of the invention defined by the claims that appear below. Those skilled in the design of wind turbines will appreciate additional examples, modifications, and advantages based on the description. For example, it will be appreciated that the main shaft 16 and hub 6 are rigidly coupled (e.g., using one of the possibilities mentioned above) so as to be part of the same kinematic body (a "rotor body"). Although the embodiments in FIGS. 2-15 illustrate the gearbox input member 26 being coupled to the main shaft 16, in alternative embodiments the gearbox input member 26 may be coupled to this rotor body at the hub 6. FIG. 16 illustrates one example of such an embodiment.

In FIG. 16, which uses the same reference numbers to refer to structure corresponding with the other embodiments, the gearbox housing 60 is coupled directly to the bearing housing 22 and supported on the base frame 140. It was mentioned above how suspension of the gearbox 24 from the bearing housing 22 is not required; the rigidly connected elements supporting the main shaft 16 and gearbox housing 60 are considered part of the same kinematic body (a "support structure" body). In the embodiment of FIG. 16, like the other embodiments, this kinematic body supports the rotor body for rotation about the main axis 14 and constrains other movements. More specifically, the first and second bearings 18, 20 (part of the support structure body) support the main shaft 16 for rotation about the main axis 14 and constrain other movements. The gearbox housing 60 does the same with respect to the gearbox input member 26.

The gearbox input member 26 is still coupled to the rotor body with translational degrees of freedom in all directions and rotational degrees of freedom about axes perpendicular to the main axis. This is achieved, however, by coupling the gearbox input member 26 to the hub 6 (with the coupling 64) rather than to the main shaft 16. The gearbox input member 26 includes a torque tube 180 extending through the main shaft 16 to the coupling 64 so that the gearbox 24 can remain positioned behind the bearing housing 22. The coupling 64 shown in FIG. 16 is similar to the embodiment in FIGS. 9-11 in that it includes a coupling element 190 with pins 192 surrounded by rubber bushings 194. On one side the pins 192 and rubber bushings 194 are received in a coupling flange 196 bolted to the hub 6. On the other side the pins 192 and rubber bushings 194 are received in a coupling flange 198 bolted to the torque tube 180 (and, therefore, rigidly coupled to the gearbox input member 26). This and other embodiments are not discussed in detail, as the discussion above about other possibilities still applies. Skilled persons will appreciate how the kinematics between the rotor body, support structure, and gearbox input member are maintained to provide similar advantages.

In light of the above, the details of any particular embodiment should not be seen to necessarily limit the scope of the claims below.

What is claimed:

1. An operational power transmission system for increasing the rotational speed from a rotor of a wind turbine, comprising:
    a main shaft configured to be driven by the rotor about a main axis;
    a support structure including at least one bearing supporting the main shaft for rotation about the main axis and constraining other movements of the main shaft; and
    a gearbox having a gearbox housing rigidly coupled to the support structure and a gearbox input member coupled to the main shaft, the gearbox housing supporting the gearbox input member for rotation about the main axis while constraining other movements of the gearbox input member, and the gearbox input member being coupled to the main shaft with translational degrees of freedom in all directions and rotational degrees of freedom about axes perpendicular to the main axis.

2. The power transmission system according to claim 1, wherein the support structure further includes a bearing housing surrounding the at least one bearing, the gearbox housing being suspended from the bearing housing.

3. The power transmission system according to claim 2, wherein the main shaft is coupled to the gearbox input member by a flexible coupling, the power transmission system further comprising:
    a coupling housing surrounding the flexible coupling, the gearbox housing being suspended from the bearing housing via the coupling housing.

4. The power transmission system according to claim 2, further comprising:
    a generator having a generator rotor and stator positioned within a generator housing, the generator housing being rigidly coupled to and suspended from the gearbox housing.

5. The power transmission system according to claim 2, wherein the at least one bearing comprises a first bearing and a second bearing spaced apart within the bearing housing.

6. The power transmission system according to claim 5, the bearing housing having a first support leg and a second support leg positioned proximate the first bearing and a third support leg and a fourth support leg positioned proximate the second bearing, the power transmission system further comprising: a base frame to which the first, second, third, and fourth legs of the bearing housing are mounted, the base frame having a circular bottom and being shaped to distribute loads received from the bearing housing across the circular bottom.

7. A power transmission system for increasing the rotational speed from a rotor of a wind turbine, comprising:
    a main shaft configured to be driven by the rotor about a main axis;
    a support structure including at least one bearing supporting the main shaft for rotation about the main axis and constraining other movements of the main shaft; and
    a gearbox having a gearbox housing rigidly coupled to the support structure and a gearbox input member coupled to the main shaft, the gearbox housing supporting the gearbox input member for rotation about the main axis while constraining other movements of the gearbox input member, and the gearbox input member being coupled to the main shaft with translational degrees of freedom in all directions and rotational degrees of freedom about axes perpendicular to the main axis;
    wherein the main shaft is coupled to the gearbox input member by flexible coupling defined by:
        a terminal portion associated with the main shaft;
        a terminal portion associated with the input member; and
        a coupling element coupled to each of the terminal portions thereby defining two joints, wherein each joint permits relative rotation between the coupling element and respective terminal portion around axes perpendicular to the main axis and relative translation along the main axis.

8. The power transmission system according to claim 7, wherein the flexible coupling comprises a curved spline tooth coupling.

9. The power transmission system according to claim 7, the terminal portions having radially-projecting teeth, the coupling element having radially-projecting teeth engaging the radially-projecting teeth of the terminal portions thereby defining two gear meshes, and wherein one set of radially-projecting teeth in each gear mesh have substantially straight profiles and the other set have profiles crowned in an axial direction.

10. The power transmission system according to claim 9, wherein the terminal portions are coupling flanges associated with the main shaft and input member, the radially-projecting teeth of the coupling flanges have crowned profiles, and the coupling element surrounds the coupling flanges.

11. The power transmission system according to claim 7, wherein the coupling element includes a first set of teeth projecting radially inward and a second set of teeth projecting radially outward, and further wherein one of the terminal portions engages the first set of teeth and the other engages the second set of teeth.

12. The power transmission system according to claim 7, wherein the flexible coupling further includes joint elements positioned between the terminal portions and the coupling element, the joint elements comprising a flexible material.

13. The power transmission system according to claim 12, wherein the coupling element includes projections extending toward the terminal portions of the main shaft and input member, the terminal portions including recesses in which the projections are received, and the joint elements being positioned between the projections and recesses.

14. The power transmission system according to claim 13, wherein the projections are pins extending from the coupling element, the joint elements are rubber bushings positioned on the pins, and the recesses are holes in the terminal portions.

15. The power transmission system according to claim 7, wherein the coupling element comprises a tube having a first end surrounding the terminal portion of the main shaft and a second end surround the terminal portion of the input member, the terminal portions being coupled to the first and second ends by one or more flexible discs.

16. A wind turbine, comprising:
a rotor having a hub and rotor blades mounted to the hub;
a power transmission system according to claim 1, wherein the main shaft is coupled to the hub so as to be driven by the rotor.

17. A wind turbine, comprising:
a hub; and
an operational power transmission system, including:
a main shaft rigidly coupled to the hub so as to form a kinematic rotor body;
a support structure including at least one bearing supporting the main shaft for rotation about a main axis and constraining other movements of the main shaft; and
a gearbox having a gearbox housing rigidly coupled to the support structure and a gearbox input member coupled to the rotor body, the gearbox housing supporting the gearbox input member for rotation about the main axis while constraining other movements of the gearbox input member, and the gearbox input member being coupled to the rotor body with translational degrees of freedom in all directions and rotational degrees of freedom about axes perpendicular to the main axis.

18. The wind turbine according to claim 17, wherein the gearbox input member is coupled to the main shaft.

19. The wind turbine according to claim 17, wherein the gearbox input member is coupled to the hub.

20. A wind turbine, comprising:
a hub; and
a power transmission system, including:
a main shaft rigidly coupled to the hub so as to form a kinematic rotor body;
a support structure including at least one bearing supporting the main shaft for rotation about a main axis and constraining other movements of the main shaft; and
a gearbox having a gearbox housing rigidly coupled to the support structure and a gearbox input member coupled to the rotor body, the gearbox housing supporting the gearbox input member for rotation about the main axis while constraining other movements of the input member, and the gearbox input member being coupled to the rotor body with translational degrees of freedom in all directions and rotational degrees of freedom about axes perpendicular to the main axis;
wherein the main shaft is coupled to the gearbox input member by flexible coupling defined by:
a terminal portion associated with the main shaft;
a terminal portion associated with the input member; and a coupling element coupled to each of the terminal portions thereby defining two joints, wherein each joint permits relative rotation between the coupling element and respective terminal portion around axes perpendicular to the main axis and relative translation along the main axis.

21. A power transmission system for increasing the rotational speed from a rotor of a wind turbine, comprising:
a main shaft configured to be driven by the rotor about a main axis;
a support structure including at least one bearing supporting the main shaft for rotation about the main axis and constraining other movements of the main shaft; and
a gearbox having a gearbox housing rigidly coupled to the support structure and a gearbox input member coupled to the main shaft, the gearbox housing supporting the gearbox input member for rotation about the main axis while constraining other movements of the gearbox input member, and the gearbox input member being coupled to the main shaft with translational degrees of freedom;
wherein the gearbox input member is coupled to the main shaft by a flexible coupling for accommodating misalignments in a radial direction, including one or more offsets along one or more axes perpendicular to the main axis, and in an axial direction, including an offset along the main axis, and for accommodating angular offsets, wherein the flexible coupling has translational degrees of freedom in all directions and rotational degrees of freedom about axes perpendicular to the main axis, wherein the flexible coupling is torsionally stiff such that the flexible coupling has no rotational degree of freedom about the main axis, and wherein the flexible coupling is defined by:
a main shaft terminal portion associated with the main shaft;
an input member terminal portion associated with the input member; and
a coupling element coupled to the main shaft terminal portion and the input member terminal portion thereby defining two joints, wherein each joint permits relative rotation between the coupling element and respective main shaft terminal portion or input member terminal portion around axes perpendicular to the main axis and relative translation along the main axis.

* * * * *